May 13, 1947.   L. J. MARHOEFER ET AL   2,420,488
METHOD OF FORMING LAMINATED HOLLOW STRUCTURES
Filed Feb. 6, 1943   2 Sheets-Sheet 1
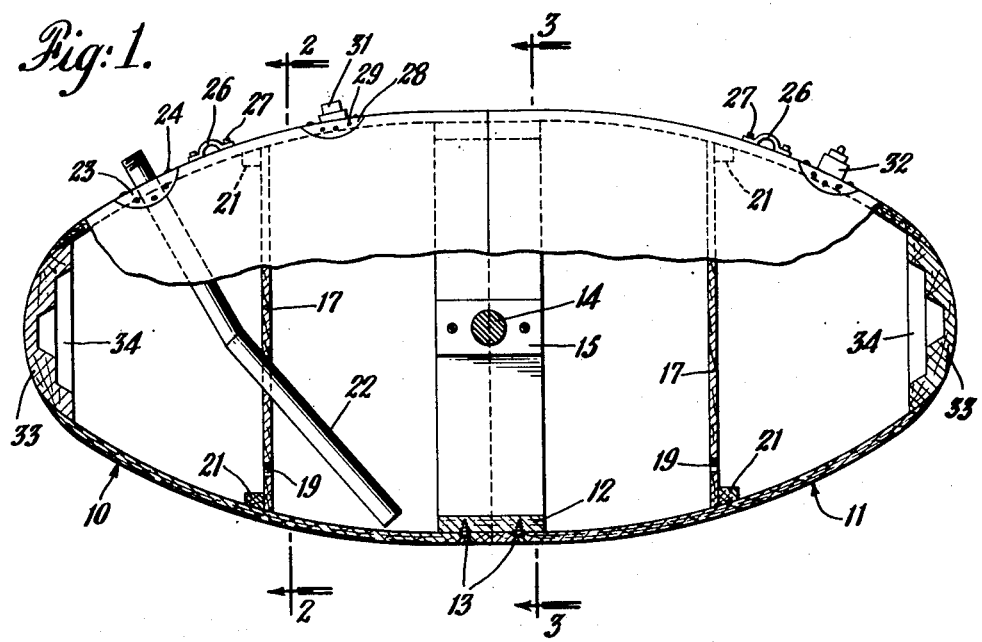
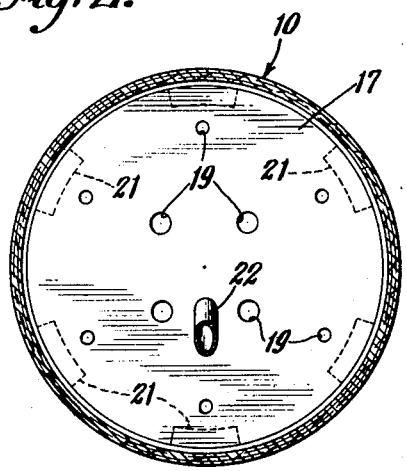 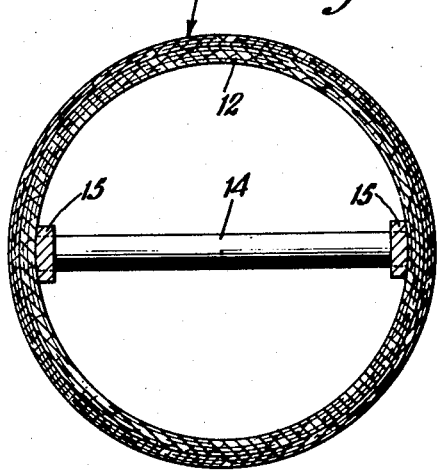
INVENTORS
L. J. Marhoefer, W. A. Taylor and E. R. Vidal.
ATTORNEY May 13, 1947.   L. J. MARHOEFER ET AL   2,420,488
METHOD OF FORMING LAMINATED HOLLOW STRUCTURES
Filed Feb. 6, 1943   2 Sheets-Sheet 2
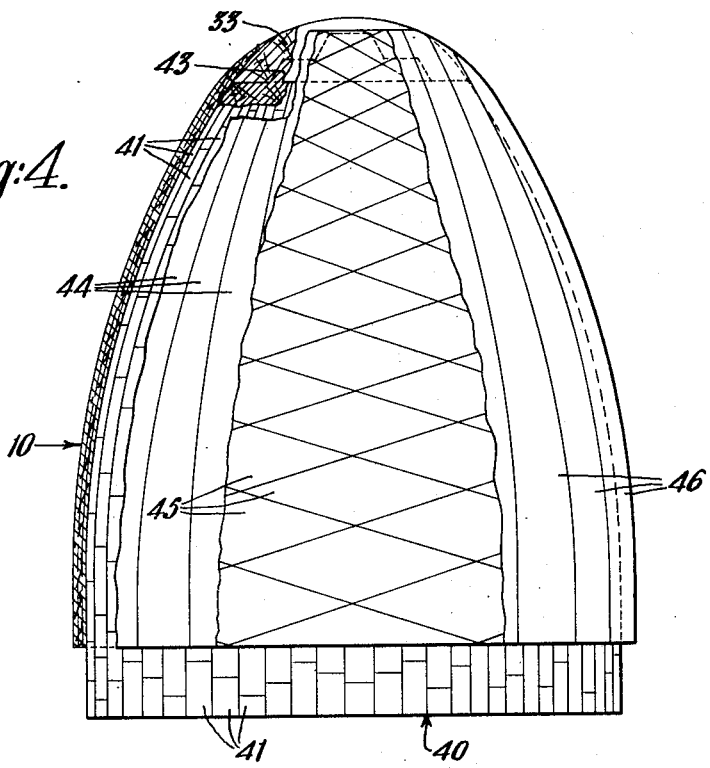
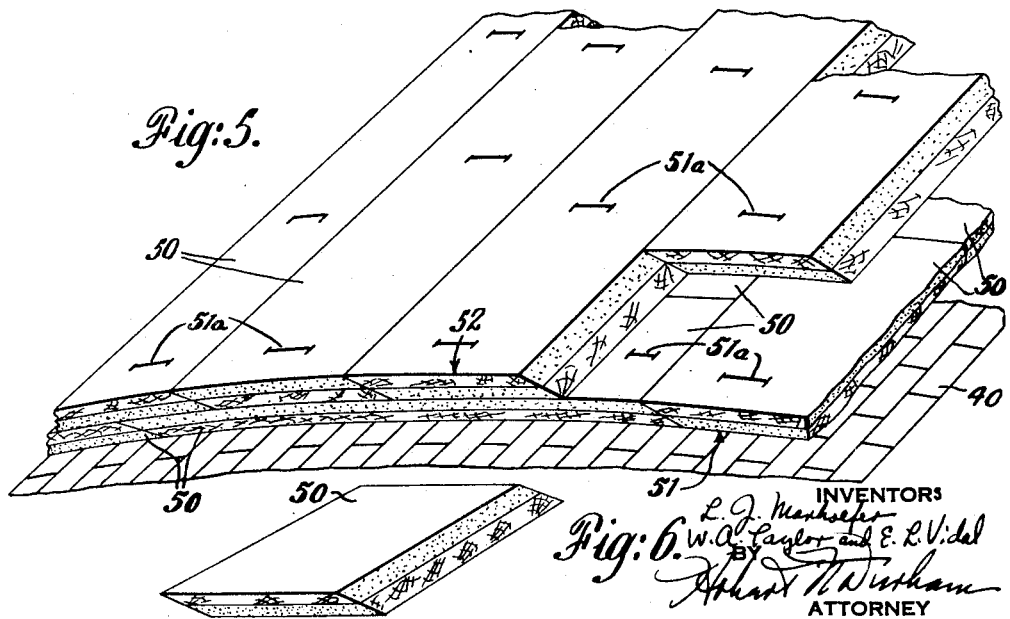
INVENTORS
L. J. Marhoefer
W. A. Taylor and E. R. Vidal
BY
ATTORNEY Patented May 13, 1947

2,420,488

UNITED STATES PATENT OFFICE 2,420,488

METHOD OF FORMING LAMINATED HOLLOW STRUCTURES

Laurence J. Marhoefer, Haddon Heights, and William A. Taylor, Wildwood, N. J., and Eugene L. Vidal, Washington, D. C., assignors to Vidal Corporation, a corporation of Delaware Application February 6, 1943, Serial No. 475,040

1 Claim. (Cl. 154—110)

This invention relates to certain new and useful improvements in the art of fabricating laminated hollow structures from fibrous sheet material and relates more particularly to methods of fabricating laminated storage vessels, such as aircraft fuel tanks and other containers for liquids from sheet material.

Objects and advantages of the invention will be set forth in part hereinafter and in part will be obvious herefrom, or may be learned by practice with the invention, the same being realized and attained by means of the processes, steps and combinations pointed out in the appended claim.

The invention consists in the novel steps, methods, procedures, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a view in side elevation with parts in section of an airplane fuel tank embodying this invention;

Fig. 2 is a view in section taken along the line 2—2 of Fig. 1;

Fig. 3 is a view in section taken along the line 3—3 of Fig. 1;

Fig. 4 is an enlarged cutaway view in elevation of a laminated hollow structure, suitable for use for the nose or tail section of the fuel tank of Fig. 1, in position upon a mold, showing details of the laminated construction;

Fig. 5 is a view in perspective of a portion of a shell structure such as that of Fig. 4 but embodying an alternative form of laminated construction; and, Fig. 6 is a view in perspective of a typical unit of the shell structure of Fig. 5 showing the scarfed construction of the unit.

Objects of this invention are to provide certain new and useful improvements in methods of fabricating hollow laminated structures from fibrous sheet material; to provide an improved method for fabricating storage vessels of laminated construction for storing fuels, lubricants or other fluids, from fibrous sheet material; to provide a method for fabricating aircraft fuel tanks of laminated construction from fibrous sheet material; and, to provide a new and improved method of fabricating hollow laminated structures of compound curvature from fibrous sheet material.

To these ends, and in accordance with this invention, a mold is prepared having, in whole or in part, a surface configuration of compound curvature, that is, a configuration wherein all of the surface elements are non-rectilinear.

Illustrative of molds of the aforesaid nature are those whose molding surface is a surface of revolution such as is generated by the revolution of a semi-circle, or of a conic section, e. g., a parabola, about its axis of symmetry.

Obviously, however, the molding surface may have a configuration of compound curvature over one portion and a configuration of simple curvature over another, the two blending or not as the case may be. Illustrative of the latter is a mold for a hollow structure of more or less projectile shape wherein the nose portion of generally parabolic contour merges into a body portion of generally cylindrical contour.

The configuration of the mold is of course selected so as to provide a configuration for the article to be formed most suitable for the service to which the article is to be put. Thus, an article for use as a storage vessel for liquids under conditions wherein low aerodynamic drag is of prime consideration would preferably have a configuration of generally stream-line contour, the nose and tail portions being of relatively sharp compound curvature and the intermediate portion being of lesser compound curvature or possibly of simple curvature; for example, cylindrical contour.

Such a vessel is most advantageously constructed in two sections each constituting the front or rear half of the vessel, the sections when completed being assembled into a unitary structure. It is apparent that each section, however, in itself constitutes a hollow structure for which the other section forms a closure.

A number of multiple unit layers of the fibrous sheet material are assembled on the mold, at least the contacting faces of the units being treated with a suitable adhesive. The inner face of the units of the inner layer and the outer face of the units of the outer layer may be left untreated in order to prevent adhesion between the mold and the inner layer, and between the outerlayer and the caul by means of which the laminae are subsequently caused to conform to the mold contour.

Each layer as applied is composed of a plurality of adhesively treated planar units each of relatively small area compared to the total area of the molding surface.

By fashioning each layer as a plurality of small units, substantial conformance of the layer to the configuration of the mold is obtained notwithstanding the compound curvature of the molding surface.

Conformance of the respective units is further enhanced by fashioning each in more or less strip form, that is, of greater length than breadth. A unit so fashioned may be applied to an area of compound curvature with its long dimension lying either in the direction of maximum or minimum curvature. In general, however, the sharper the curvature the shorter must the strip be. The length will also depend somewhat on the stiffness of the unit, an increase in thickness being accompanied by a commercial reduction in length. Similar considerations govern the permissible practical width of the units. It therefore follows that as the curvature of an area to be covered becomes sharper, the dimensions of a unit, or portion of a unit over a given area, must be decreased accordingly.

The unit pattern, except for the considerations governing the capacity of the unit to conform to a given curvature, is not of itself a critical factor so long as the units may be assembled on the mold so that each layer will form a continuous covering surface. Obviously, the pattern of the units in each layer will depend in a great measure upon the configuration of the molding surface. Illustrative patterns are those of diamond, triangular, truncated triangular, rectangular, or other polygonal shape. Other suitable patterns will be apparent to those skilled in the art.

Preferably, the units of each layer are of a single thickness of sheet material, that is, they are one ply. Various thicknesses of material may be employed, the thinner materials, however, facilitating conforming of the unit to the surface to which it is applied. Sheet material of from about one thirty-second to about one-eighth inch thickness are suitable for most structures.

Where the units are single ply, they are advantageously assembled in each layer with the sides or edges of adjacent units in abutting relationship thereby forming a more or less regular seam pattern in each layer.

In order to minimize leakage through the walls of the structure when completed, the layers are assembled so that the seams of one layer will lie in offset relation to the seams of another in so far as is possible.

In order that the completed structure will have equal wall strength in directions at right angles to each other, units of the same layer have the grain of the material of which they are formed lying in the same direction, preferably lengthwise of the unit. Units of the succeeding layer are assembled so as to lie in cross-grained relation to the units of the preceding layer.

Instead of the units being single ply they may be multiply. In such case, each unit as assembled on the mold is preferably of preformed two ply construction in which the plies lie in cross-grained relation. Since each unit possesses substantially equal strength in directions at right angles to each other, the units of the successive layers may be assembled on the mold in generally parallel rows so that all of the units run in the same direction.

With the units running in the same direction, they may be of substantially the same pattern throughout, the length and width of each, however, being governed by the curvature of the particular area over which it is to lie, as has previously been explained.

It will be apparent that the seam pattern in this embodiment of the present invention will be characterized by substantial parallelism of the seams in one direction. In consequence, the units are preferably scarfed along their lengthwise edges, adjacent units of the same layer being assembled in overlapping relationship along the scarfed edges. Each succeeding layer is preferably arranged so that its seams will be out of alignment with the seams of the preceding layer so as to minimize leakage in the completed structure.

After the layers have been assembled on the mold, the resultant mold assembly is subjected to a fluid pressure molding operation whereby under the influence of heat and pressure the respective units are caused to conform exactly to the mold and the layers become adhesively bonded to each other so as to produce a unitary hollow structure of the desired configuration. The mold is removed from the structure and the latter may thereafter be subjected to such further finishing operations of sanding, trimming, painting, reinforcing and/or assembly with other structures of the same or different configuration as may be best suited to produce the desired finished article.

It will be understood that the foregoing general description and the following detailed description as well are exemplary and explanatory but are not restrictive of the invention.

Referring now more particularly to the accompanying drawings, there is depicted in Fig. 1 a novel aircraft fuel tank of laminated construction fabricated from wood veneer in accordance with this invention.

As here embodied, the tank is of generally streamlined contour and consists of a laminated nose section 10 and a laminated tail section. The sections are joined in abutting relation by means of an annular laminated coupling and reinforcing member 12 to which the respective nose and tail sections are anchored and sealed as by wood screws 13 and a suitable adhesive so as to provide a liquid-tight joint at the coupling.

The coupling member 12 as embodied may be fabricated from solid arcuate segments of wood but preferably, and as here embodied, is a heat and pressure molded member fabricated from thin strips of wood veneer which are adhesively bonded to each other as by a synthetic resin adhesive.

Suitable reinforcing means for the coupling member 12 are provided in the form of a diametral brace member 14 which terminates at its ends in a pair of anchoring blocks 15 anchored to the coupling member as by screws (not shown) and/or adhesive.

Each of the tank sections 10 and 11 is internally braced and partitioned intermediate its ends by one of a pair of apertured baffle members 17, which serve to restrict the free flow of fuel within the tank in flight.

The baffle members 17 are respectively apertured as at 19 to the desired extent. Each preferably snugly engages the section 10 or 11 as the case may be throughout its perimeter and is anchored in position to a suitable number of wood blocks 21 as by wood screws (not shown) and/or adhesive.

A fuel pipe 22 is inserted in the nose section 10 through a suitable opening in the upper half thereof and passes through the nose baffle member 17 to a suitable low level locus within the tank.

Means are provided for supporting the fuel pipe 22 from the tank and for sealing the pipe and tank to each other. As here embodied, the pipe 22 is provided with a collar 23 adjacent its outlet, the collar being fastened to the nose section 10 as by screws 24. The collar 23 preferably lies flush with the tank surface which is suitably recessed for the purpose.

Means are provided for attaching the fuel tank to the aircraft. As here embodied, a pair of fittings 26 are secured to the fuel tank, one to the top of each section as by screws 27. The fittings 27 are preferably so constructed and arranged as to permit ready release of the fuel tank in flight from the structure by which it is carried on the aircraft.

A fitting 28 through which fuel is adapted to be supplied to the tank is secured as by screws 29 to the top of the nose section 10 over an opening therein, the nose section being suitably recessed so that the fitting lies flush with the surface thereof. A filler plug 31 removably engages the fitting so as normally to seal the opening, and a suitable vent fitting 32 is provided in the tail section 11.

Each of the tank sections 10 and 11 terminates at its tip in a solid wood closure member 33 whose base is recessed as at 34 so as to reduce its weight without material reduction in strength. The recess 34 has the added function of providing a socket by means of which the member 33 is removably attached to a mold during the fabrication of the nose or tail section.

The nose section 10 and tail section 11 are each of laminated construction, the fabrication of each being carried out in the same manner and as follows.

Referring now more particularly to Fig. 4 for an understanding of the fabrication of a laminated hollow structure such as the nose section 10 or tail section 11, there is depicted a male mold 40 having a configuration corresponding, for example, to that of the nose section 10.

The mold 40 is preferably built up from a plurality of small wooden pieces 41 suitably shaped so as to provide the desired contour and terminates at its tip in a removable nose piece 33 corresponding to the closure members 33 of Fig. 1.

The nose piece 33 has a recessed base complementary to a fitting 43 of the mold, the fitting serving to hold the nose piece in position during fabrication of the shell structure.

The outer periphery of the nose piece is preferably treated with a suitable adhesive, preferably, a synthetic resin adhesive of the thermosetting type, such as Plaskon, Durez, or the like.

The mold is now covered with a first layer of fibrous sheet material in the form of units 44 which are assembled on the mold with their edges in abutting relationship. Each of the units 44 as embodied is a strip cut from a larger panel of sheet material in accordance with a predetermined pattern. As here embodied, the units 44 are of generally truncated triangular shape having been cut from a panel or sheet of wood veneer so that the grain of the wood runs generally lengthwise of the strip. Each unit 44 is relatively narrower at one end where the circumferential mold curvature is sharp than at its other end where the mold curvature is less. The units 44 are laid lengthwise of the mold since the curvature of the mold lengthwise is generally less than the circumferential curvature except in the vicinity of the tip where the curvature becomes greater. Since bending of the units 44 is easiest across the grain and the curvature of the surface to which they must conform lengthwise is not excessive, the lengthwise dimension of the unit can be appreciable.

Each of the units 44 is of one ply and treated on the side away from the mold with a suitable adhesive. Each overlaps the nose piece 33 and may be held in position temporarily by staples passing through the unit into the mold.

A second layer of fibrous sheet material is applied over the first layer in the form of units 45 are assembled with their edges in abutting relationship. Each of the units 45, as embodied, is a strip cut from a larger panel of the sheet material in accordance with a predetermined pattern, the units which are to cover an area of relatively sharp curvature being smaller than those which are to cover a larger area. As here embodied, the units 45 are approximately diamond shaped strips of single ply wood veneer adhesively treated on either side with a suitable adhesive and having the grain of the wood running lengthwise of the strip.

Each unit 45 is applied to the mold in crossgrained relation to the subjacent units 44, the lengthwise extent of the units 45 being appreciably less than that of the units 44 since the mold curvature circumferentially adjacent the base is materially greater than the curvature lengthwise at the same location. However, as the degree of curvature circumferentially becomes greater in approaching the tip, the lengthwise dimension of the units and their area is commensurately decreased so as to permit the attainment of the desired conformation. Stapling is employed to hold the units temporarily in position and as the units 45 are applied, the staples in the units 44 are removed.

A third layer of fibrous material as now applied in the form of units 46 which as here embodied are similar to the units 44 and have a grain running in the same direction as the latter. The units 46 are preferably adhesively treated only on their underside and are temporarily secured by means of staples which hold all the units on the mold. It will be observed that the bottom row of units 45 is of substantially triangular shape so as to provide a matching edge for joining two such structures to each other as in the fuel tank of Fig. 1.

As thus assembled, the three ply structure formed substantially conforms to the configuration of the mold 40, the assembly having been carried out so that the seams of the bottom layer and the seams of the top layer lie in angularly offset relation to each other. Obviously, any desired number of plies may be employed within practical limits as governed by considerations of weight, strength, rigidity and other recognized factors. Similarly, the thickness of each layer may be selected and varied in accord with similar considerations. The layers may be of all wood veneer or the middle layer may be of a different fibrous material such as a phenol impregnated cloth or paper base fabric. The units 45 may be of a different geometrical pattern such as a truncated triangular shape or a simple triangular shape and may be applied diagonally instead of circumferentially so as to obtain a 45° grain relationship rather than the 90° relationship shown in Fig. 4. It is also apparent that the first and second layers may be interchanged with the subsequent layer or layers arranged accordingly, the essential requirement being that the units be of such size and pattern that they may be made to conform exactly under the application of heat and pressure to the contour of the mold without wrinkling, buckling or displacement.

After the units have been assembled on the mold, the mold assembly is preferably wrapped in paper, Cellophane or other suitable material and encased in a fluid impervious vented jacket (not shown) preparatory to molding. The wrapping served to prevent the jacket from adhering to the mold assembly and assists in holding the units on the mold.

Molding of the laminated structure is then carried out as in an autoclave (not shown) under conditions of temperature and pressure suitable to cause the units to conform to the configuration of the mold and to cause the units to adhere and become bonded to each other and to the nose piece 42 throughout the entire contacting surfaces thereof. A temperature of from about 240° F. to about 270° F., preferably about 250° F., and a pressure of from about 60 p. s. i. to 90 p. s. i., preferably about 80 p. s. i., is generally sufficient to effect the desired molding, and to set the adhesive in the event a thermosetting resin is employed.

The particular technique employed in molding the structure forms no part of the present invention but may be, for example, that disclosed in U. S. Patent No. 2,276,004, granted March 10, 1942, to E. L. Vidal et al.

Upon completion of the molding operation, the assembly is withdrawn from the jacket and the mold removed. The inner and outer surfaces are preferably sanded and smoothed to obtain the desired finished surface condition, the nose portion of the structure being carefully contoured so as to eliminate any irregularities consequent upon overlapping of the laminae on the noise piece 33.

The plasticizing and flowing of the fibrous material of which the respective multiple unit layers are constituted, during molding tends to, and in a substantial measure does, seal minute openings such as are created in stapling the units to the mold and seals the innumerable pores of the fibrous material. The adhesive, plasticized under the heat, performs a similar function. In order to ensure the obtainment of a liquid tight structure, however, the interior surface is preferably also coated with one or more layers of a slushing compound, such as Durez or other suitable commercially available coating material for the purpose. The exterior may be similarly treated.

The baffle members 17, fuel pipe 22, fittings 26, 28 and 32 are next assembled in the sections 10 and 11 which are then combined by means of the annular reinforcing member 12 to form the complete tank. Obviously, the interior of the sections 10 and 11 may be again treated with suitable liquid proofing compounds before assembly of the sections into a unit but after insertion of the baffle members 17. It is also apparent that the juncture of the sections may be sealed with liquid proofing material in any suitable manner. Such expedients will be readily apparent to those skilled in the art.

Referring now more particularly to the embodiment shown in Fig. 5, each layer of fibrous material comprises a plurality of preformed units 50 of plural ply construction adhesively bonded to each other. As embodied, each unit 50 is of plural ply construction and of strip form, that is, each is of greater length than breadth and is of relatively small area relative to the total area of the mold surface to be covered.

The units 50, Fig. 5, as here embodied, are respectively fashioned from sheets of two-ply wood veneer or other suitable fibrous material, the plies of which are in cross grained relation to each other. The sides of each unit are scarfed at an angle sufficient to provide an appreciable bonding surface when the units are assembled with the scarfed sides in overlapping relation, the ends of each unit being substantially perpendicular to the upper and lower surfaces of the unit. Each unit is treated over its entire surface with a suitable adhesive, preferably a thermo-setting resin.

In fabricating a fuel tank such as that of Fig. 1 but embodying the construction of Figs. 5 and 6, the tank shell is first fabricated, the sections 10 and 11 being separately formed on a mold much as has previously been explained. In such case, each mold is provided with a removable tip portion such as the element 33, Fig. 4, and assembly of the hollow laminated structure which is to form the sections 10 or 11 proceeds as follows:

The first layer 51 of units 50 is assembled on the mold such as the mold 40, Fig. 4, the respective units being temporarily tacked thereto by means of staples 51a in the positions depicted in Fig. 5.

The units 50 of the first layer are positioned lengthwise of the mold, that is, with their long dimension in the direction of least curvature. Units in the same row have their ends in abutting relation and units in adjacent rows have their scarfed sides overlapping over the scarfed areas.

In order to minimize leakage paths, the units are of different lengths so that the seams between the ends of units in the same row will not coincide with corresponding seams in adjacent rows so as to provide a continuous circumferential seam.

The second layer 52 of units 50 is now applied unit by unit upon the layer 51 as is depicted in Fig. 5, the lengthwise direction of each unit running in the same direction as that of the subjacent units. The units of the second layer are temporarily secured by means of staples, the staples in the underlying units being removed as the overlaying units are secured to the mold.

In applying the second layer, the same considerations respecting discontinuity of circumferential, that is, endwise seams, govern. Further, the units are assembled so that the longitudinal, that is, side seams of the respective layers are offset with relation to each other, thereby to minimize leakage possibilities.

The units having been assembled, the assembly is then covered with a wrapping of paper, or Cellophane and jacketed, in the manner previously described, and is then subjected to a heat and pressure molding operation, such as has previously been described.

The resulting laminated hollow structure, as removed from the mold will have the desired configuration and constitute an integral molded structure of liquid-tight or substantially liquid-tight construction.

The inner and outer surfaces are next sanded to remove the lands formed at the overlaps and tip, the internal reinforcing elements and fittings installed and the surfaces slushed with a liquid proofing compound all in the manner previously described. Assembly of the nose and tail sections 10 and 11 is carried out and the completed tank structure is ready for service.

It will be understood that the foregoing illustrative embodiments of this invention are by way of example only and that the multiple unit layers may take other forms as will be apparent to those skilled in the art. Thus, in the fabrication of propeller spinners, fuel tanks or laminated dome-shaped hollow structures in general from sheets of wood veneer, the structure may comprise four layers, for example, each layer being fashioned of stave-shaped units of substantially similar pattern. In such case, the first layer may be fashioned of units of which the grain runs longitudinally of the unit and structure. The second and third layers may comprise units of which the grain runs across the individual units. The fourth layer may have the grain running longitudinally of the units as in the first layer. The units of the second and third layers in such case are preferably built up of a number of smaller elements assembled in the desired relationship with the grain transversely of the unit. In applying the successive layers, each layer is applied so that the longitudinal seams of a layer are in offset relation to the longitudinal seams of a preceding layer, the offset in each layer being in the same direction as the offset of the preceding layer so that in section the seams would appear in a somewhat stepped relation in the successive layers.

It will be understood that instead of the grain, in one layer of stave-shaped units, running longitudinally of the unit and the grain of the succeeding layer running transversely of the units of that layer to achieve the preferred 90° relationship, the grain of the units in a layer may run at a generally 45° angle to the longitudinal dimension of the stave-shaped units of the layer. The next succeeding layer may then have the grain thereof running at 45° to the longitudinal dimension of the unit but at an opposite inclination so as to obtain the desired 90° relationship in successive layers.

Although in most instances it will be found preferable to have the stave-shaped units of a pattern providing a longitudinal axis of symmetry, it is also within the contemplation of this invention to provide the units of a pattern in which the median longitudinal axis and the longitudinal edges are curved so that each unit may be wrapped on the mandrel on a 45° spiral. In such case, the curvature of the axis, or centerline, of a unit is suitably adjusted to provide the required angle at each location on the mandrel, with the unit in the position on the mandrel which it is ultimately to occupy.

It will be understood also that a fuel tank, for example, can be fabricated in more than two sections, if desired. Thus, it may be fabricated in four sections joined to each other along longitudinal as well as transverse juncture lines. Obviously, any number of sections can be prefabricated and then joined together by means of cold glue or any suitable adhesive into the desired structure.

The invention in its broader aspects is not limited to the specific steps, combinations and apparatus shown and described but departures may be made therefrom within the scope of the accompanying claim without departing from the principles of the invention and without sacrificing its chief advantages.

What is claimed is:

The method of producing a hollow member whose surface is in part at least of a configuration in which all of the surface elements are non-rectilinear, the member including a multi-ply shell and a separate nose piece and tapering outwardly from said nose piece along an axis constituting the axis of symmetry of the member comprising the steps of providing a form that is complementary in surface configuration to said shell and includes said nose piece as an element freely detachably associated therewith, cutting from sheet material groups of planar units to be applied to said form each unit being of sufficiently small area to conform substantially to the configuration of the shell in the position on said form the unit is to occupy, and the units of each group, when placed edge to edge, forming a rudimentary ply having substantially the shape and area of a ply for said shell, placing the units of each group on said form in edge to edge relation to each other in assembly with said nose piece to form a series of rudimentary plies circumferentially enclosing said nose piece, with adhesive between each ply and the adjacent ply and between said nose piece and said plies, subjecting the assembly to a shaping and bonding operation to shape the rudimentary plies to the configuration of the shell and to cause said plies to become adhesively bonded to each other and to said nose piece thereby to produce said hollow member; and, withdrawing said form, minus its nose piece, from said member.

LAURENCE J. MARHOEFER.
WILLIAM A. TAYLOR.
EUGENE L. VIDAL.

REFERENCES CITED

The following references are of record in the file of this patent:

UNITED STATES PATENTS

| Number | Name | Date |
| --- | --- | --- |
| 203,557 | Plumbly | May 14, 1878 |
| 448,870 | Wilcox | Mar. 24, 1891 |
| 2,276,004 | Vidal et al. | Mar. 10, 1942 |
| 2,149,507 | Camfield | Mar. 7, 1939 |
| 2,223,587 | Verbey | Dec. 3, 1940 |
| 1,336,011 | Wood | Apr. 6, 1920 |
| 1,654,375 | Hulsart | Dec. 27, 1927 |
| 2,286,267 | Farny | June 16, 1942 |
| 1,394,726 | Gilmore | Oct. 25, 1921 |
| 1,628,886 | Jackson et al. | May 17, 1927 |
| 2,172,093 | Thompson et al. | Sept. 5, 1939 |
| 1,916,051 | Jagschitz | June 27, 1933 |
| 2,341,637 | Mansfield | Feb. 15, 1944 |
| 1,885,406 | Bechereau | Nov. 1, 1932 |
| 1,344,634 | Haskell | June 29, 1920 |